US012386290B2

(12) United States Patent
Tanaka et al.

(10) Patent No.: US 12,386,290 B2
(45) Date of Patent: Aug. 12, 2025

(54) FIXING DEVICE INCLUDING AN ENDLESS BELT MEMBER AND A STEERING ROLLER PROVIDING LUBRICATION TO THE ENDLESS BELT MEMBER

(71) Applicant: CANON KABUSHIKI KAISHA, Tokyo (JP)

(72) Inventors: Kenichi Tanaka, Ibaraki (JP); Rikiya Takemasa, Chiba (JP); Takuya Hasegawa, Tokyo (JP); Tatsuo Yasui, Tokyo (JP); Tomoyuki Kuriyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/588,433

(22) Filed: Feb. 27, 2024

(65) Prior Publication Data

US 2024/0295843 A1 Sep. 5, 2024

(30) Foreign Application Priority Data

Mar. 3, 2023 (JP) ................................ 2023-032951

(51) Int. Cl.
*G03G 15/20* (2006.01)

(52) U.S. Cl.
CPC ..... *G03G 15/2025* (2013.01); *G03G 15/2064* (2013.01); *G03G 2215/2038* (2013.01)

(58) Field of Classification Search
USPC .......................................................... 399/320
See application file for complete search history.

(56) References Cited

U.S. PATENT DOCUMENTS 10,520,868 B1 * 12/2019 Tomita ............... G03G 15/2053
11,269,272 B2 3/2022 Tatezawa et al.
2007/0059064 A1 * 3/2007 Okuda ................ G03G 15/206 399/329

FOREIGN PATENT DOCUMENTS

JP 2009116141 A * 5/2009
JP 2010217270 A 9/2010
JP 2011123296 A 6/2011
JP 2020091359 A 6/2020
JP 2021140135 A 9/2021

* cited by examiner

*Primary Examiner* — Quana Grainger
(74) *Attorney, Agent, or Firm* — ROSSI, KIMMS & McDOWELL LLP

(57) ABSTRACT

A fixing device includes an endless belt member, a rotary member, a nip portion forming member and a steering roller. The steering roller is disposed inside the belt member and configured to be swung to control a position of the belt member in a width direction of the belt member. The steering roller includes a lubricant impregnated portion impregnated with a lubricant and contacting an inner peripheral surface of the belt member.

7 Claims, 8 Drawing Sheets

FIXING DEVICE INCLUDING AN ENDLESS BELT MEMBER AND A STEERING ROLLER PROVIDING LUBRICATION TO THE ENDLESS BELT MEMBER

BACKGROUND OF THE INVENTION

Field of the Invention

The present invention relates to a fixing device that fixes a toner image to a recording material by heating the toner image borne on the recording material.

Description of the Related Art

An image forming apparatus such as a copying machine, a printer, a facsimile, or a multifunction peripheral having a plurality of functions thereof includes a fixing device that fixes a toner image borne on a recording material to the recording material. As a configuration of a fixing device, it has been hitherto known that a toner image on a recording material is conveyed while being heated in a nip portion formed by an endless belt member and a rotary member. In such a fixing device including a belt member, a lubricant application member for applying a lubricant to an inner peripheral surface of the belt member has been hitherto provided in order to improve durability of the belt member (for example, JP 2010-217270 A and JP 2011-123296 A).

In the above-described conventional configuration, since the lubricant application member is provided separately from a stretching roller that stretches the belt member, the number of members disposed inside the belt member increases, making it difficult to reduce the size of the device.

SUMMARY OF THE INVENTION

The present invention provides a configuration for easily achieving a reduction in size of a device while applying a lubricant to an inner peripheral surface of a belt member.

According to one aspect of the present invention, a fixing device fixes a toner image to a recording material by heating the toner image borne on the recording material. The fixing device includes an endless belt member, a rotary member configured to rotate in contact with an outer peripheral surface of the belt member, a nip portion forming member disposed inside the belt member and configured to form a nip portion for nipping and conveying the recording material between the belt member and the rotary member, and, a steering roller disposed inside the belt member and configured to be swung to control a position of the belt member in a width direction of the belt member. The steering roller includes a lubricant impregnated portion impregnated with a lubricant and contacting an inner peripheral surface of the belt member.

Further features of the present invention will become apparent from the following description of exemplary embodiments with reference to the attached drawings.

DESCRIPTION OF THE EMBODIMENTS

First Embodiment

Figure 1:
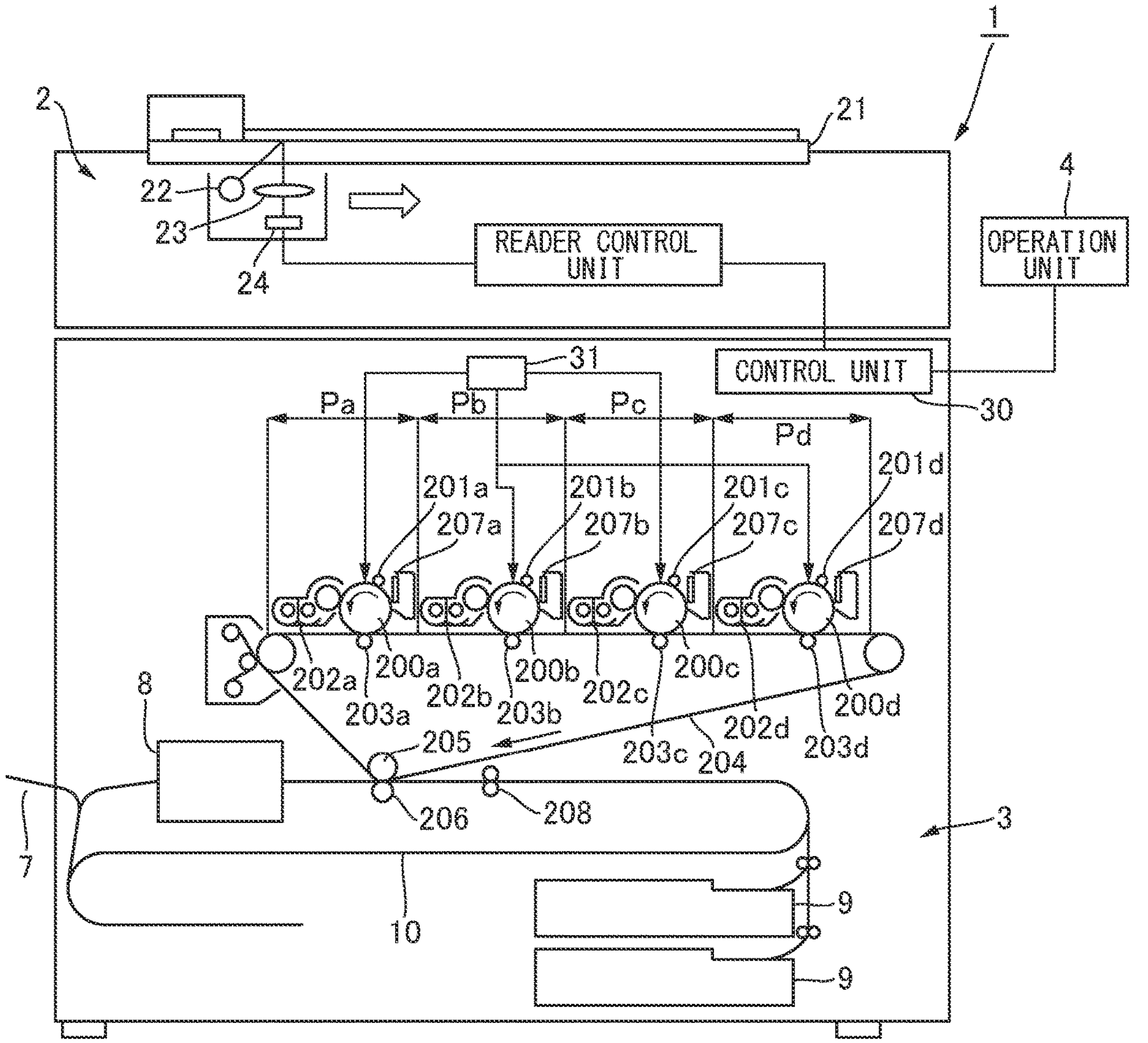
FIG. 1 is a schematic cross-sectional view illustrating a configuration of an image forming apparatus according to a first embodiment.

A first embodiment will be described with reference to FIGS. 1 to 3. First, a schematic configuration of an image forming apparatus according to the present embodiment will be described with reference to FIG. 1.

Image Forming Apparatus

The image forming apparatus 1 is an electrophotographic full-color printer including four image forming units Pa, Pb, Pc, and Pd provided to correspond to four colors of yellow, magenta, cyan, and black. In the present embodiment, the image forming units Pa, Pb, Pc, and Pd are arranged in a tandem type along a rotation direction of an intermediate transfer belt 204 to be described below. The image forming apparatus 1 forms a toner image (image) on a recording material according to an image signal from an image reading unit (document reading device) 2 connected to an image forming apparatus body 3 or a host device such as a personal computer communicably connected to the image forming apparatus body 3. Examples of the recording material include sheet materials such as paper, a plastic film, and cloth.

The image forming apparatus 1 includes an image reading unit 2 and an image forming apparatus body 3. The image reading unit 2 reads a document placed on a platen glass 21. Light emitted from a light source 22 is reflected by the document, and an image is formed on a CCD sensor 24 via an optical system member 23 such as a lens. Such an optical system unit converts the document into an electric signal data string for each line by scanning the document in an arrow direction. The image signal obtained by the CCD sensor 24 is sent to the image forming apparatus body 3, and a control unit 30 performs image processing in accordance with each image forming unit to be described below. The control unit 30 also receives an external input from an external host device such as a print server as an image signal.

The image forming apparatus body 3 includes a plurality of image forming units Pa, Pb, Pc, and Pd, and each of the image forming unit forms an image based on the above-described image signal. That is, the image signal is converted into a laser beam subjected to pulse width modulation (PWM) by the control unit 30. A polygon scanner 31 serving as an exposing unit scans the laser beam corresponding to the image signal. Then, photosensitive drums 200*a* to 200*d* which serve as image bearing members of the image forming units Pa to Pd are irradiated with a laser beam.

Note that Pa, Pb, Pc, and Pd, which denote an image forming unit for yellow (Y), an image forming unit for magenta (M), an image forming unit for cyan (C), and an image forming unit for black (Bk), respectively, form images of corresponding colors. Since the image forming units Pa to Pd are substantially the same, the image forming unit Pa for Y will be described in detail below, and the description of the other image forming units will be omitted. In the image forming unit Pa, a toner image is formed on a surface of the photosensitive drum 200*a* based on the image signal as will be described below.

A charging roller 201*a* serving as a primary charger charges the surface of the photosensitive drum 200*a* to a predetermined potential to prepare for forming an electrostatic latent image. An electrostatic latent image is formed on the surface of the photosensitive drum 200*a* charged to the predetermined potential by a laser beam from the polygon scanner 31. A developing unit 202*a* develops the electrostatic latent image on the photosensitive drum 200*a* to form a toner image. A primary transfer roller 203*a* performs discharging from a back surface of the intermediate transfer belt 204, applies a primary transfer bias having a polarity opposite to that of the toner, and transfers the toner image on the photosensitive drum 200*a* onto the intermediate transfer belt 204. After the transfer, the surface of the photosensitive drum 200*a* is cleaned by a cleaner 207*a*.

In addition, the toner image on the intermediate transfer belt 204 is conveyed to the next image forming unit, and toner images for the respective colors formed by the respective image forming units are sequentially transferred in the order of Y, M, C, and Bk, and images of four colors are formed on the surface thereof. Then, the toner image having passed through the image forming unit Pd for Bk located on the most downstream side in the rotation direction of the intermediate transfer belt 204 is conveyed to a secondary transfer portion including a pair of secondary transfer rollers 205 and 206. Then, in the secondary transfer portion, a secondary transfer electric field having a polarity opposite to that of the toner images on the intermediate transfer belt 204 is applied, thereby secondarily transferring the toner images to the recording material.

The recording material is accommodated in a cassette 9, and the recording material fed from the cassette 9 is conveyed to, for example, a registration portion 208 including a pair of registration rollers, and stands by at the registration portion 208. Thereafter, the registration portion 208 conveys the recording material to the secondary transfer portion at a timing controlled to align the toner images on the intermediate transfer belt 204 and the paper.

The recording material to which the toner images have been transferred by the secondary transfer portion is conveyed to a fixing device 8, and the toner images bome on the recording material are fixed to the recording material by being heat-pressurized in the fixing device 8. The recording material having passed through the fixing device 8 is discharged to a sheet discharge tray 7. Note that, in a case where images are formed on both surfaces of the recording material, when toner images are transferred and fixed to a first surface (front surface) of the recording material, the front and back surfaces of the recording material are reversed via a reverse conveyance portion 10, toner images are transferred and fixed to a second surface (back surface) of the recording material, and the recording material is placed on the sheet discharge tray 7.

Note that the control unit 30 controls the entire image forming apparatus 1 as described above. Furthermore, the control unit 30 can perform various settings and the like based on an input from an operation unit 4 included in the image forming apparatus 1. The control unit 30 includes a central processing unit (CPU), a read only memory (ROM), and a random access memory (RAM). The CPU controls each unit while reading a program corresponding to the control procedure stored in the ROM. In addition, work data and input data are stored in the RAM, and the CPU performs control with reference to the data stored in the RAM based on the above-described program or the like.

Fixing Device

Next, a configuration of the fixing device 8 according to the present embodiment will be described with reference to FIG. 2. FIG. 2 is a cross-sectional view schematically illustrating a schematic configuration of the fixing device 8. In the present embodiment, a belt heating type fixing device using an endless belt is adopted. In FIG. 2, an X direction represents a conveyance direction of the recording material P, a Y direction represents a width direction intersecting (in the present embodiment, orthogonal to) the conveyance direction of the recording material P, and a Z direction represents a pressure direction of a pressure roller 305 to be described below. These directions are orthogonal to each other. Further, one side in the width direction (Y direction) is a front side of the image forming apparatus 1, for example, a side on which the operation unit 4 is disposed and operated by a user. On the other hand, the other side in the width direction is a back side of the image forming apparatus 1.

The fixing device 8 includes a heating unit 300 having a fixing belt 301 serving as an endless rotatable belt member, and a pressure roller 305 serving as a rotary member that contacts the fixing belt 301 and forms a nip portion N together with the fixing belt 301.

The heating unit 300 includes the fixing belt 301 described above, a fixing pad 303 serving as a nip portion forming member and a pad member, a lubricant application roller 308 serving as a stretching roller and a first stretching roller, and a heating roller 307 serving as a second stretching roller. The pressure roller 305 is also a driving rotary member that rotates in contact with an outer peripheral surface of the fixing belt 301 to apply a driving force to the fixing belt 301.

The fixing belt 301 serving as a fixing member and a rotary member has thermal conductivity, heat resistance, and the like, and has a thin cylindrical shape. In the present embodiment, the fixing belt 301 has a three-layer structure in which a base layer, an elastic layer on the outer periphery of the base layer, and a release layer on the outer periphery of the elastic layer are formed. Further, a polyimide resin (PI) is used as a material for the base layer having a thickness of 80 μm, a silicone rubber is used for the elastic layer having a thickness of 300 μm, and PFA (tetrafluoroethylene/perfluoroalkoxyethylene copolymer resin) is used as a fluororesin for the release layer having a thickness of 30 μm. The fixing belt 301 is stretched by the fixing pad 303, the heating roller 307, and the lubricant application roller 308.

The fixing pad 303 is disposed inside the fixing belt 301 in a non-rotating manner so as to face the pressure roller 305 with the fixing belt 301 interposed therebetween. The fixing pad 303 forms the nip portion N for nipping and conveying the recording material between the fixing belt 301 and the pressure roller 305. In the present embodiment, the fixing pad 303 is a substantially plate-like member that is long along the width direction of the fixing belt 301 (a longitudinal direction intersecting with the rotation direction of the fixing belt 301 and a rotation axis direction of the heating roller 307). The nip portion N is formed by pressing the fixing pad 303 against the pressure roller 305 with the fixing belt 301 interposed therebetween. As a material for the fixing pad 303, a liquid crystal polymer (LCP) resin is used.

The fixing pad 303 is supported by a stay 302 serving as a support member disposed inside the fixing belt 301. That is, the stay 302 is disposed on a side of the fixing pad 303 opposite to the pressure roller 305 to support the fixing pad 303. The stay 302, which is a reinforcing member having rigidness and a long length along the longitudinal direction of the fixing belt 301, contacts the fixing pad 303 to support the fixing pad 303 from the back. That is, when the fixing pad 303 is pressed against the pressure roller 305, the stay 302 imparts strength to the fixing pad 303 to secure the pressurizing force in the nip portion N.

A sliding member, which is not illustrated, is interposed between the fixing pad 303 and the fixing belt 301. A lubricant is applied to an inner peripheral surface of the fixing belt 301 in advance, so that the fixing belt 301 smoothly slides with respect to the fixing pad 303 covered with the sliding member. As the lubricant, oil is used. Silicone oil is suitable for this oil from the viewpoint of heat resistance and the like. In addition, oils having various viscosities are applicable depending on the use conditions, but an oil having an excessively high viscosity is inferior in fluidity at the time of application, and therefore, an oil having a viscosity of 30,000 cSt or less is usually preferable. Specific examples of the oil include, but are not particularly limited to, dimethyl silicone oil, amino-modified silicone oil, and fluorine-modified silicone oil.

The heating roller 307 is disposed inside the fixing belt 301 to stretch the fixing belt 301 together with the fixing pad 303 and the lubricant application roller 308. The heating roller 307 is formed of metal such as aluminum or stainless steel in a cylindrical shape, and a halogen heater 306 serving as a heating portion for heating the fixing belt 301 is disposed inside the heating roller 307. Then, the heating roller 307 is heated to a predetermined temperature by the halogen heater 306.

In the present embodiment, the heating roller 307 is formed of, for example, a stainless steel pipe having a thickness of 1 mm. One or more halogen heaters 306 may be installed. Note that the heating unit is not limited to the halogen heater, and may be another heater capable of heating the heating roller 307, such as a carbon heater. The fixing belt 301 is heated by the heating roller 307 heated by the halogen heater 306, and is controlled to a predetermined target temperature corresponding to the type of recording material based on a temperature detected by a thermistor, which is not illustrated.

As will be described below, the lubricant application roller 308 is impregnated with a lubricant, is disposed inside the fixing belt 301, stretches the fixing belt 301 together with the fixing pad 303 and the heating roller 307, and rotates following the fixing belt 301. In the present embodiment, the lubricant application roller 308 is also a tension roller biased by a biasing spring 309 serving as a biasing member supported by a frame 320 of the heating unit 300 to apply a predetermined tension to the fixing belt 301.

The pressure roller 305 rotates in contact with the outer peripheral surface of the fixing belt 301 to apply a driving force to the fixing belt 301. In the present embodiment, the pressure roller 305 is a roller in which an elastic layer is formed on an outer periphery of a shaft and a releasable layer is formed on an outer periphery of the elastic layer. Further, stainless steel having a diameter of 72 mm is used for the shaft, conductive silicone rubber having a thickness of 8 mm is used for the elastic layer, and PFA (tetrafluoroethylene/perfluoroalkoxyethylene copolymer resin) is used as a fluororesin having a thickness of 100 μm for the releasable layer. The pressure roller 305 is rotatably supported by a fixing frame (not illustrated) of the fixing device 8, while one end to which a gear is fixed, and is connected to a motor M1 serving as a pressure roller driving source via the gear to be rotationally driven.

In the fixing device 8 configured as described above, a toner image is heated while the recording material P bearing the toner image is conveyed in a nipped state in the nip portion N formed between the fixing belt 301 and the pressure roller 305. Then, the toner image is fixed to the recording material P Therefore, the fixing device 8 needs to have both a function of applying heat and pressure and a function of conveying the recording material P The pressure roller 305 is pressed against the fixing pad 303 via the fixing belt 301 by a driving source that is not illustrated. In the present embodiment, the pressurizing force (NF) in the nip portion N for forming an image is set to 1600 N, the length of the nip portion N in the X direction (conveyance direction) is set to 24.5 mm, and the length of the nip portion N in the Y direction (width direction) is set to 326 mm.

Further, a discharge unit 350 for discharging the recording material P having passed through the nip portion N to the outside of the fixing device 8 is disposed downstream of the nip portion N in the conveyance direction of the recording material P In the discharge unit 350, a separator 401, a sheet discharge roller pair **400*a*, and a lower separation guide 400*b* are disposed. The separator 401 is disposed downstream of the nip portion N in the conveyance direction of the recording material and above the nip portion N in the vertical direction, with a distal end facing the fixing belt 301 near the nip portion N. Then, the recording material P having passed through the nip portion N is separated from the fixing belt 301**.

The lower separation guide **400*b* is disposed downstream of the nip portion N in the conveyance direction of the recording material and below the nip portion N in the vertical direction, with a distal end facing the pressure roller 305 near the nip portion N. Then, when the recording material P sticks to the pressure roller 305, the lower separation guide 400*b* separates the recording material P from the pressure roller 305. Further, the lower separation guide 400*b* supports a lower surface of the recording material P discharged from the nip portion N and guides the recording material P to the discharge roller pair 400*a*. The sheet discharge roller pair 400*a* discharges the recording material P discharged from the nip portion N to the outside of the fixing device 8. In the present embodiment, the sheet discharge roller pair 400*a*** is disposed downstream of the nip portion N by about 40 mm in the conveyance direction.

Further, a guide unit 94 for guiding the recording material P to the nip portion N and a detection sensor 95 for detecting the recording material P immediately before the nip portion N are disposed upstream of the nip portion N of the fixing device 8 in the conveyance direction. The control unit 30 (FIG. 1) detects a timing at which the recording material P enters the nip portion N using the detection sensor 95.

Lubricant Application Roller

Next, the lubricant application roller 308 will be described with reference to FIG. 3. FIG. 3 is a schematic cross-sectional view of the lubricant application roller (oil application tension roller) 308 cut in the longitudinal direction. The lubricant application roller 308 includes a core metal portion 308*a* serving as a rotation shaft portion (core metal) and an oil impregnated layer 308*b* serving as a lubricant impregnated portion disposed around the core metal portion 308*a*. The core metal portion 308*a* is, for example, a roller shaft portion made of aluminum, iron, stainless steel, or the like.

The oil impregnated layer 308*b*, which is a layer impregnated with a lubricant, is provided around the core metal portion 308*a* of the lubricant application roller 308, and contacts the inner peripheral surface of the fixing belt 301. The oil impregnated layer 308*b* is formed by winding a nonwoven fabric around the core metal portion 308*a*, the nonwoven fabric being impregnated with the same lubricant as the above-described lubricant (in the present embodiment, silicone oil) applied in advance to the inner peripheral surface of the fixing belt 301. However, the oil impregnated layer 308*b* is not limited thereto. The oil impregnated layer 308*b* may be made of, for example, an organic or inorganic porous material such as a sponge or a porous ceramic body, woven fabrics of organic or inorganic fibers such as cloth and polyester fibers, or the like.

In the present embodiment, the core metal portion 308*a* of the lubricant application roller 308 includes a shaft portion 308*a*1 supported by a bearing 310 to be described below, and a body portion 308*a*2 provided around the center of the shaft portion 308*a*1 in the longitudinal direction (rotation axis direction). The body portion 308*a*2 may be formed integrally with the shaft portion 308*a*1, or may be formed by fixing a separate cylindrical member to the shaft portion 308*a*1. The oil impregnated layer 308*b* is formed by, for example, winding a nonwoven fabric impregnated with silicone oil around the body portion 308*a*2 a plurality of times.

As described above, the lubricant application roller 308 is a tension roller, and is disposed inside the fixing belt 301. Both ends of the core metal portion 308*a* in the longitudinal direction (rotation axis direction) are rotatably supported by bearings 310, respectively. The biasing spring 309 biases the lubricant application roller 308 toward the fixing belt 301 via the bearings 310 at both ends thereof. In the present embodiment, the biasing spring 309 biases the lubricant application roller 308 to the fixing belt 301 at about 60 N or more and 100 N or less to apply tension to the fixing belt 301.

Figure 2:
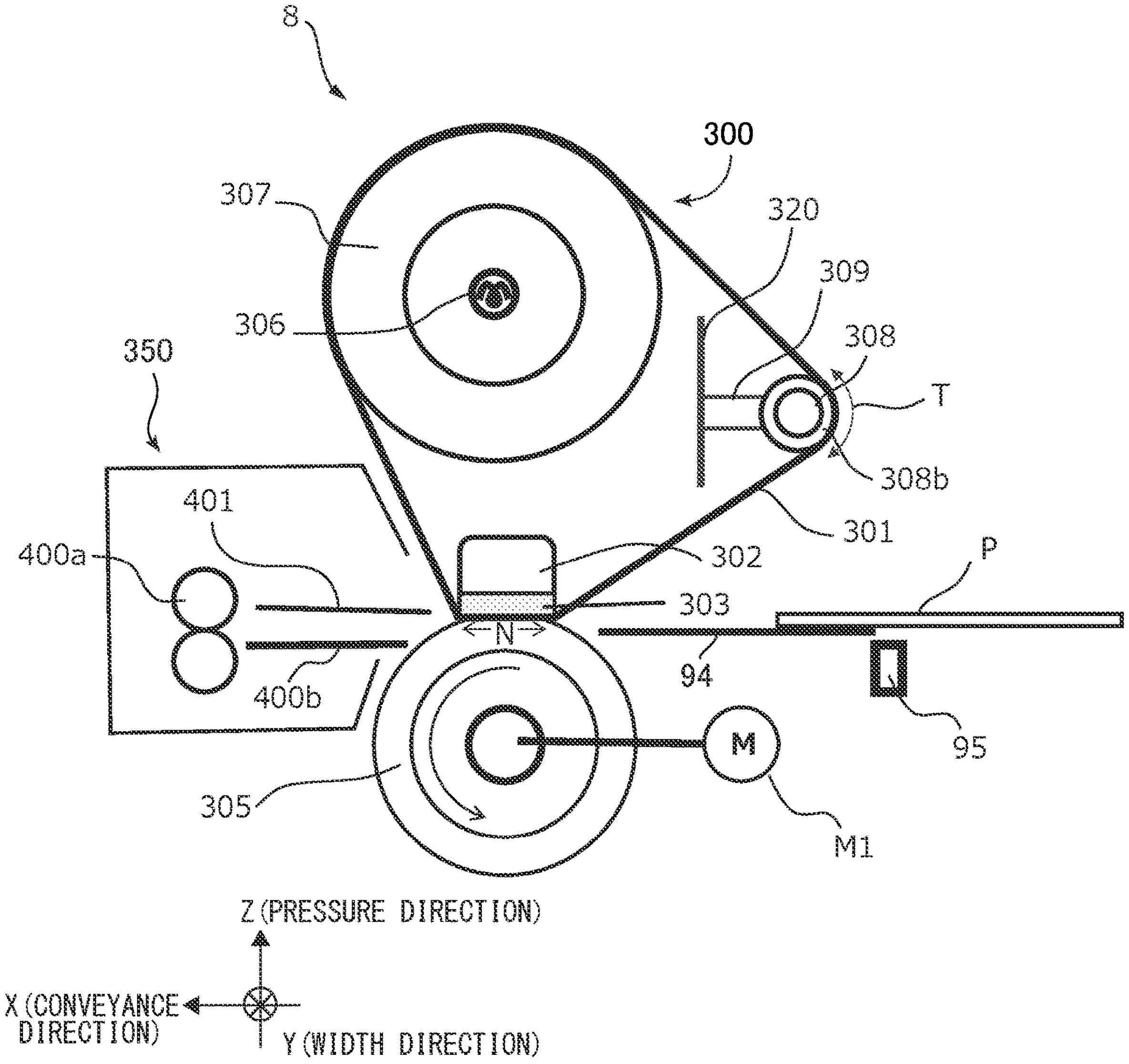
FIG. 2 is a schematic cross-sectional view illustrating a configuration of a fixing device according to the first embodiment.

As illustrated in FIG. 2, the lubricant application roller 308 contacts the fixing belt 301 at a certain winding angle in an oil-applied region T. In the present embodiment, the winding angle is secured to about 100°, and the length of contact between the fixing belt 301 and the lubricant application roller 308 is secured to about 15 mm.

Here, for example, if a lubricant application member is brought into contact with the fixing belt 301 from an inner surface of a tensioned flat portion of the belt, separately from the tension roller that applies tension to the fixing belt, it is necessary to secure a space for arranging the lubricant application member inside the belt, and it is difficult to achieve a reduction in size of the device.

In contrast, according to the configuration of the present embodiment, since the lubricant application roller 308 serves as both a tension roller and a lubricant application member, space saving inside the belt can be achieved. Furthermore, since the oil impregnated layer 308*b* of the lubricant application roller 308 contacts the inner peripheral surface of the fixing belt 301 with a sufficient biasing force over a sufficient contact area, stable lubricant application can be realized. As a result, the reduction in size of the device can be easily achieved while applying the lubricant to the inner peripheral surface of the fixing belt 301.

Roller Portion

Figure 3:
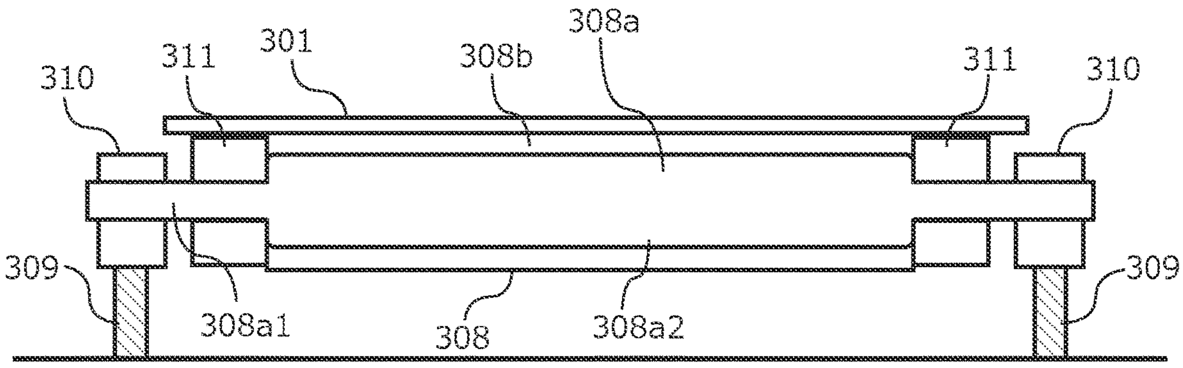
FIG. 3 is a schematic cross-sectional view illustrating a configuration of a lubricant application roller according to the first embodiment.

In the present embodiment, as illustrated in FIG. 3, the lubricant application roller 308 includes a roller portion 311 of which an outer peripheral surface is a cylindrical surface. The roller portion 311 serving as a metal portion is disposed at a position outside the oil impregnated layer 308*b* in the rotation axis direction of the lubricant application roller 308 while facing the inner peripheral surface of the fixing belt 301, and has a smaller outer diameter than the oil impregnated layer 308*b*. The roller portion 311 and the oil impregnated layer 308*b* contacts the inner peripheral surface of the fixing belt 301. A length from a first end of a roller portion 311 disposed on a first end side in the rotation axis direction (width direction) to a second end of a roller portion 311 disposed on a second end side opposite to the first end in the rotation axis direction is shorter than a length of the fixing belt 301 in the width direction. The roller portion 311 in the present embodiment has a cylindrical shape, and made of, for example, aluminum, iron, stainless steel, or the like. The roller portions 311 are disposed on both sides of the oil impregnated layer 308*b*, respectively, in the rotation axis direction of the lubricant application roller 308.

Specifically, the roller portion 311 is fitted on and supported by the core metal portion 308*a* separately from the core metal portion 308*a*, which is a support member of the lubricant application roller 308. The roller portions 311 are disposed on both sides of the oil impregnated layer 308*b*, respectively, in the rotation axis direction of the lubricant application roller 308. In addition, the roller portion 311 is disposed between the bearing 310 and the oil impregnated layer 308*b* in the rotation axis direction of the lubricant application roller 308. In the present embodiment, the roller portion 311 is disposed to contact an end portion of the oil impregnated layer 308*b*.

The outer diameter of the roller portion 311 is smaller than the outer diameter of the oil impregnated layer 308*b* in a state where the lubricant application roller 308 is biased by the biasing spring 309 to come into contact with the inner peripheral surface of the fixing belt 301 and the oil impregnated layer 308*b* is elastically deformed. Note that the outer diameter of the roller portion 311 is smaller than the outer diameter of the oil impregnated layer 308*b* in a free state of the lubricant application roller 308 that is not in contact with the fixing belt 301. In other words, in a state where the lubricant application roller 308 is not in contact with the fixing belt 301, the outer diameter of the oil impregnated layer 308*b* is larger than the outer diameter of the roller portion 311.

In addition, a difference between the outer diameter of the oil impregnated layer 308*b* and the outer diameter of the roller portion 311 in a state where the lubricant application roller 308 is not in contact with the fixing belt 301 is 0.1 mm or more and 1.0 mm or less. In the present embodiment, although the roller portion 311 is made of aluminum, iron, stainless steel, or the like, but the material thereof is not limited thereto. In addition, although the roller portion 311 is a member separate from the core metal portion 308*a*, the roller portion 311 and the core metal portion 308*a* may be integrally formed. The roller portion 311 and the core metal portion 308*a* may be separate from or integrated with each other as long as they can rotate following the rotation of the fixing belt 301.

When the roller portion 311 and the core metal portion 308*a* are separate from each other, the roller portion 311 can be detached from the core metal portion 308*a*. When the fixing device 8 is continuously used, the oil is depleted. Therefore, the oil impregnated layer 308*b* needs to be replaced at a high frequency. In a case where the roller portion 311 can be detached from the core metal portion 308*a*, the oil impregnated layer 308*b* can be easily replaced. Therefore, it is preferable that the roller portion 311 and the core metal portion 308*a* are separate from each other. In a case where the roller portion 311 and the core metal portion 308*a* are separate from each other, the roller portion 311 is configured to be rotatable with respect to the core metal portion 308*a*.

Since the roller portion 311 is included in the lubricant application roller 308 as described above, the oil impregnated layer 308*b* is deformed by a biasing force with which the lubricant application roller 311 is biased by the biasing spring 309 as much as a difference between the outer diameters of the oil impregnated layer 308*b* and the roller portion 308, and the oil oozes out from the oil impregnated layer 308*b* to the fixing belt 301, whereby the lubricant is applied.

In the present embodiment, in order to realize space saving, even though the lubricant application roller 308 is configured to serve as both a tension roller and a lubricant application member, the amount of deformation of the oil impregnated layer 308*b* caused when the lubricant application roller 308 is biased by the tension of the fixing belt 301 can be restricted to the outer diameter of the roller portion 311 provided at the end portion. Therefore, even if the tension applied to the lubricant application roller 308 is high, a leakage of the lubricant from the oil impregnated layer 308*b* can be suppressed, and the lubricant can be applied by the lubricant application roller 308 for a long period of time.

Second Embodiment

A second embodiment will be described with reference to FIGS. 4 to 8A and 8B. In the first embodiment described above, the lubricant application roller 308 is a tension roller. On the other hand, in the present embodiment, a lubricant application roller 308A serves as a steering roller as well as the tension roller. Since the other configurations and operations are similar to those in the first embodiment described above, the same configurations are denoted by the same reference signs, description and illustration thereof are omitted or simplified, and hereinafter, differences of the second embodiment from the first embodiment will be mainly described.

In a fixing device 8A according to the present embodiment, a lubricant application roller 308A is disposed in such a manner that a rotation axis thereof is tiltable with respect to a direction parallel to the rotation axis direction (width direction and longitudinal direction) of the heating roller 307. By tilting the lubricant application roller 308A, the position (shifted position) of the fixing belt 301 with respect to the rotation axis direction of the heating roller 307 is controlled. That is, the lubricant application roller 308A has a rotation center at the center or one end of the lubricant application roller 308A in the rotation axis direction (longitudinal direction), and swings about the rotation center to tilt with respect to the longitudinal direction of the heating roller 307. As a result, a tension difference is generated between one side and the other side of the fixing belt 301 in the longitudinal direction, thereby moving the fixing belt 301 in the longitudinal direction.

The fixing belt 301 is shifted toward one end portion during rotation depending on the accuracy in the outer diameter of the roller stretching the fixing belt 301, the accuracy in the alignment between the rollers, and the like. Therefore, such a shift is controlled by the lubricant application roller 308A that also serves as a steering roller. The lubricant application roller 308A may be swung by a drive source such as a motor, or may be configured to swing by self-alignment.

Figure 4:
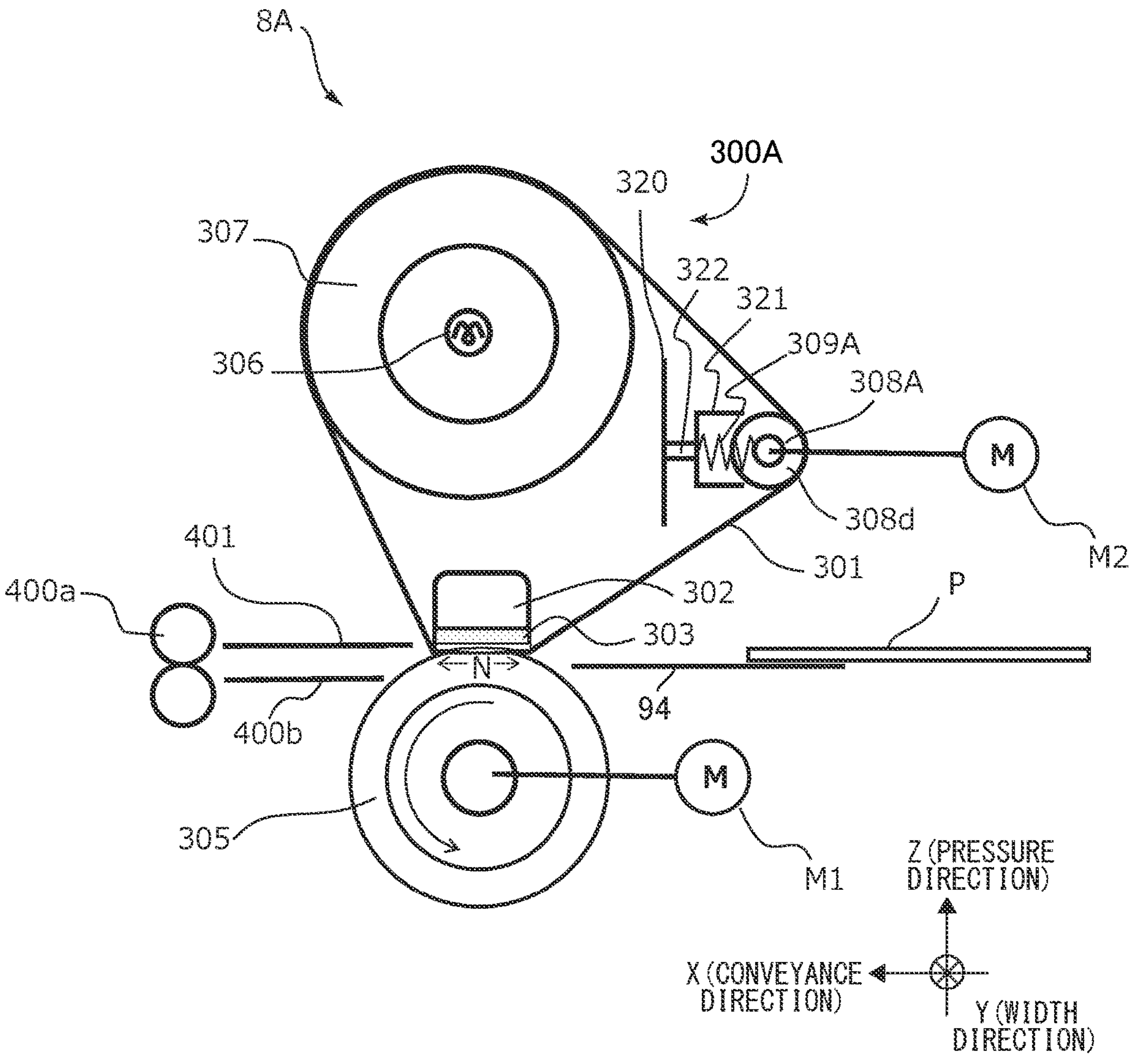
FIG. 4 is a schematic cross-sectional view illustrating a configuration of a fixing device according to a second embodiment.

The lubricant application roller 308A according to the present embodiment will be described in more detail. As illustrated in FIG. 4, the lubricant application roller 308A is disposed inside the fixing belt 301. The lubricant application roller 308A stretches the fixing belt 301, and is supported by a steering unit 321. The steering unit 321 rotates with respect to a frame 320 of a heating unit 300A with a rotating shaft 322 as a fulcrum, so that the lubricant application roller 308A is supported in such a manner as to change an angle of contact with the fixing belt 301.

Both ends of the lubricant application roller 308A are biased to one side of the fixing belt 301 at 50 N by a biasing spring 309A supported by the steering unit 321, and the lubricant application roller 308A also serves as a tension roller that applies a predetermined tension to the fixing belt 301. That is, the lubricant application roller 308A according to the present embodiment has both a function as a steering roller and a function as a tension roller.

Figure 5B:
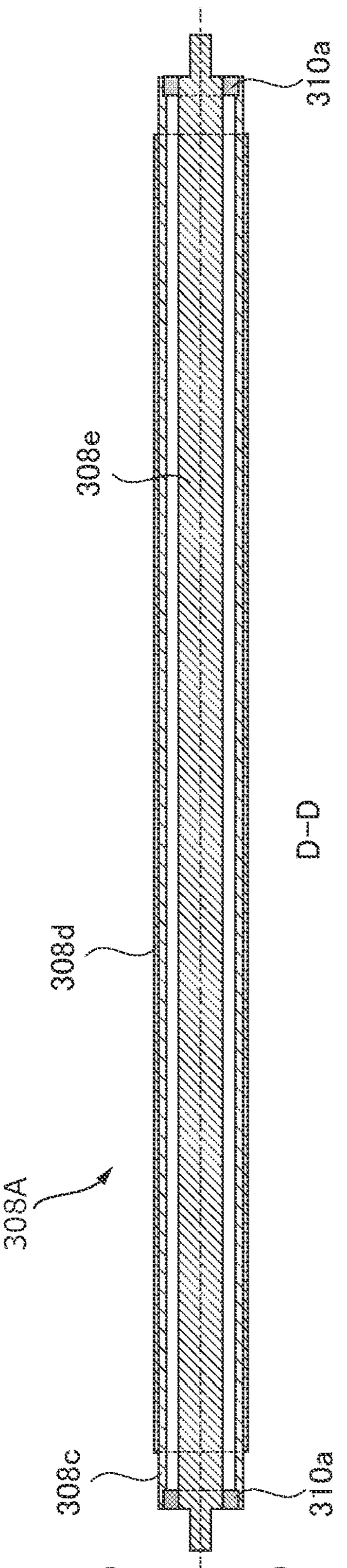
FIG. 5B is a cross-sectional view taken along line D-D of FIG. 5A.
Figure 5A:
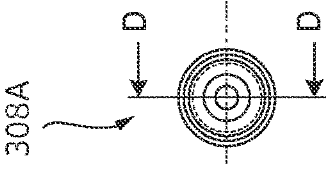
FIG. 5A is a schematic cross-sectional view illustrating a configuration of a lubricant application roller according to the second embodiment.

FIGS. 5A and 5B are cross-sectional views of the lubricant application roller 308A. FIG. 5A is a cross-sectional view of the lubricant application roller 308A taken along a direction orthogonal to the rotation axis direction, and FIG. 5B is a cross-sectional view of the lubricant application roller 308A taken along the rotation axis direction. The lubricant application roller 308A includes a cylindrical member 308*c* serving as a rotation shaft portion, and an oil impregnated layer 308*d* serving as a lubricant impregnated layer disposed around the cylindrical member 308*c*.

In the present embodiment, the lubricant application roller 308A is supported around a rotation support shaft 308*e* via bearings 310*a*. For example, the cylindrical member 308*c* is a stainless steel pipe having an outer diameter of 20 mm and a thickness of 1 mm. The oil impregnated layer 308*d* is formed by, for example, winding a nonwoven fabric having a thickness of 100 μm and impregnated with silicone oil around the cylindrical member 308*c* a plurality of times. The oil impregnated layer 308*d* is impregnated with, for example, 4 g of silicone oil.

As illustrated in FIG. 5B, both ends of the lubricant application roller 308A in the longitudinal direction (rotation axis direction) are rotatably supported by the respective bearings 310*a*. That is, the bearings 310*a* are disposed at both ends of the rotation support shaft 308*e* in the longitudinal direction, and the cylindrical member 308*c* is rotatably supported by the rotation support shaft 308*e* via the bearings 310*a* at both ends thereof. Therefore, the lubricant application roller 308A rotates following the fixing belt 301 in a state where it is supported by the rotation support shaft 308*e* via the bearings 310*a*.

Steering Operation

Figure 6A:
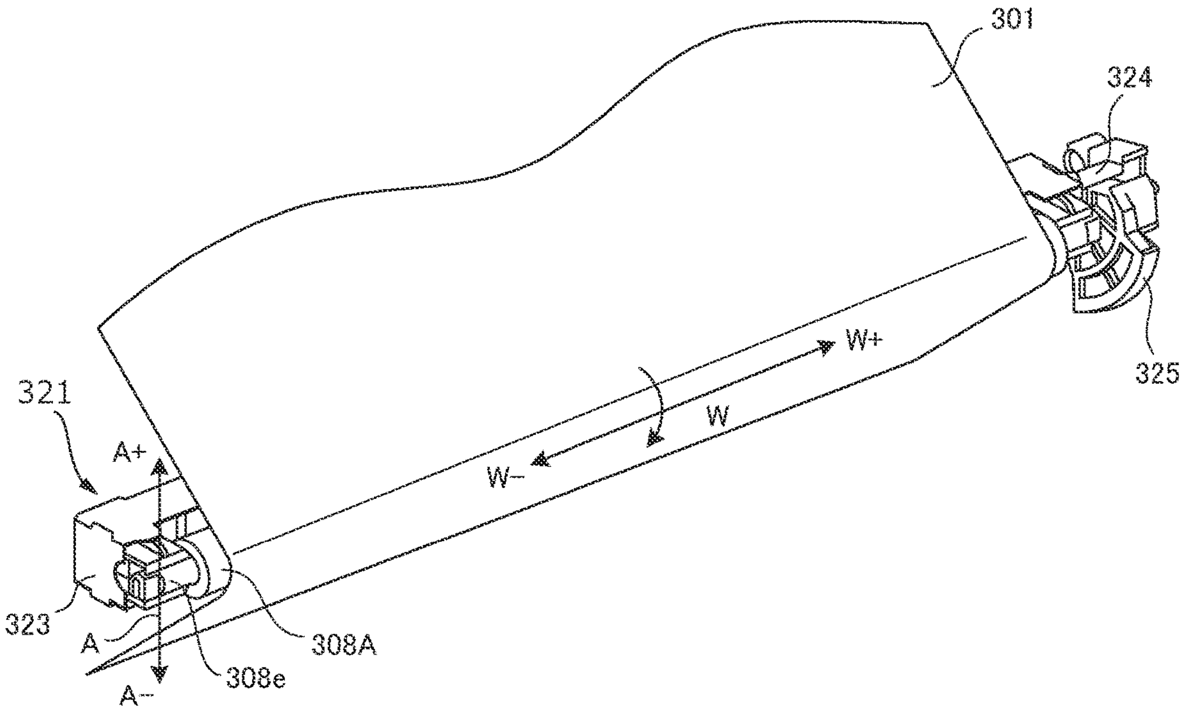
FIG. 6A is a perspective view of the vicinity of the lubricant application roller according to the second embodiment.

A steering operation of the lubricant application roller 308A will be described with reference to FIGS. 6A and 6B. FIG. 6A is a perspective view of the vicinity of the lubricant application roller 308A stretching the fixing belt 301, and FIG. 6B is a schematic view illustrating how the lubricant application roller 308A is tilted together with the fixing belt 301.

As described above, the lubricant application roller 308A is supported to be rotatable with respect to the frame 320 of the heating unit 300A via the steering unit 321. The steering unit 321 includes a steering body portion 323 that supports the lubricant application roller 308A via the rotation support shaft 308*e*, a steering shaft 324 provided at an end portion of the steering body portion 323, and a steering arm 325. The steering arm 325 is driven by a motor M2 to swing the steering shaft 324 in a direction indicated by an arrow A in FIGS. 6A and 6B. As a result, the steering body portion 323 rotates about the rotation shaft 322 (FIG. 4) via the steering shaft 324, so that the lubricant application roller 308A can change the angle with respect to the fixing belt 301.

Figure 6B:
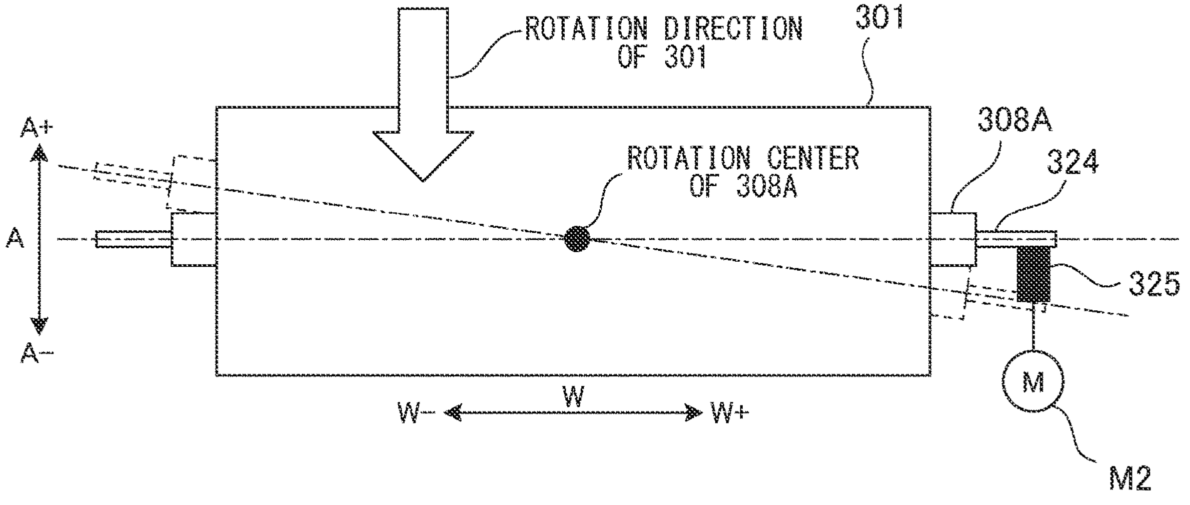
FIG. 6B is a schematic view illustrating how the lubricant application roller is tilted.

By changing the angle of the lubricant application roller 308A as described above, the fixing belt 301 stretched thereby moves along the width direction (longitudinal direction) W In a case where the lubricant application roller 308A is tilted in a direction indicated by an arrow A+ in FIGS. 6A and 6B, the fixing belt 301 is moved in a direction indicated by an arrow W− in FIGS. 6A and 6B toward a front side of the fixing device 8A (a control of a forward shift of the belt). On the other hand, in a case where the lubricant application roller 308A is tilted in a direction indicated by an arrow A− in FIGS. 6A and 6B, the fixing belt 301 is moved in a direction indicated by an arrow W+ in FIGS. 6A and 6B toward a back side of the fixing device 8A (a control of a backward shift of the belt). By repeating this operation, the fixing belt 301 reciprocates in a predetermined region in the width direction W The position of the fixing belt 301 in the width direction W, that is, the shifted position, is detected by a shifted position detection unit 330 to be described below.

Detection of Shifted Position of Fixing Belt

Figure 7:
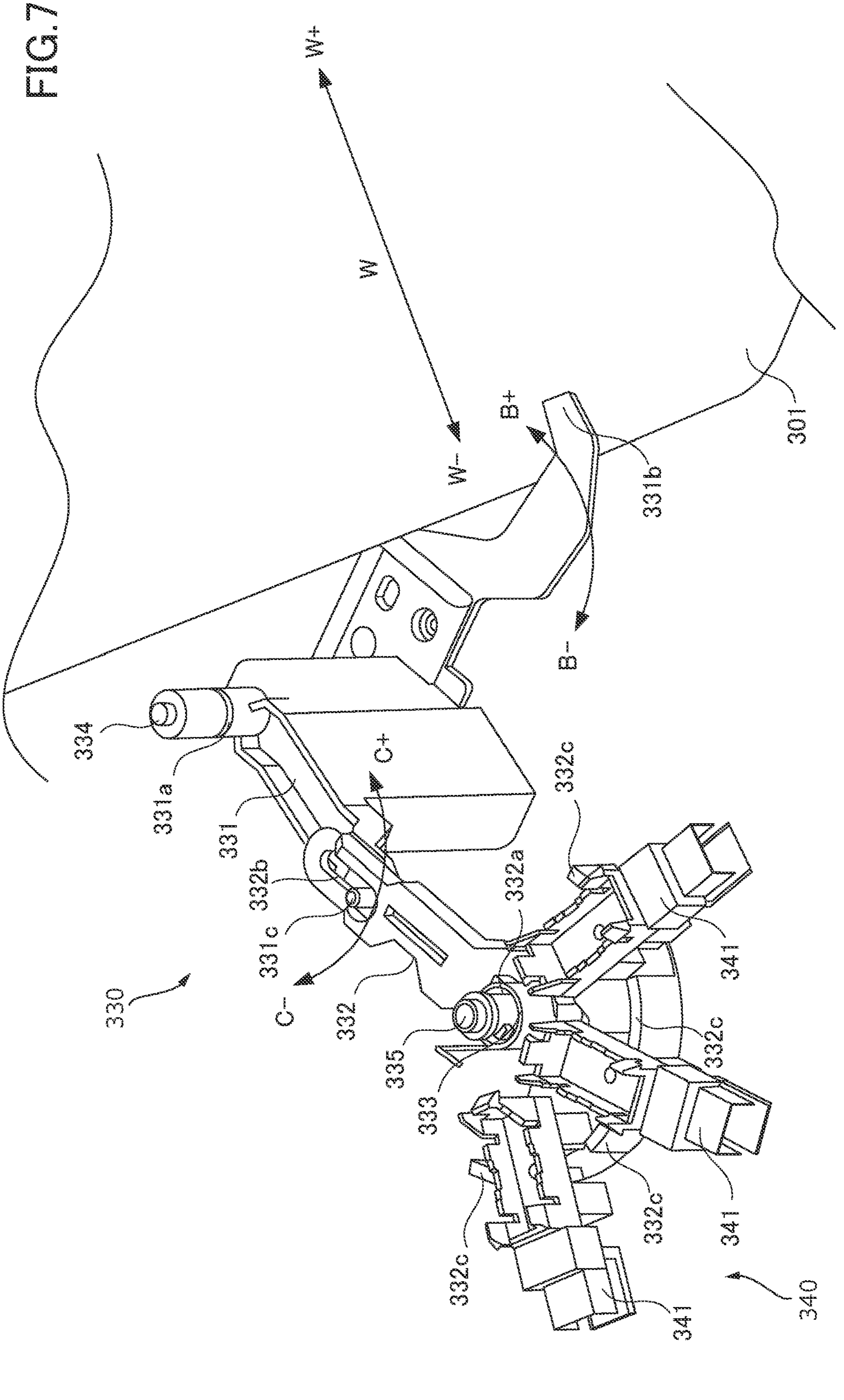
FIG. 7 is a perspective view illustrating a configuration for detecting an end surface position of a fixing belt according to the second embodiment.

Next, the shifted position detection unit 330 will be described with reference to FIG. 7. The shifted position detection unit 330 includes a belt position detection arm 331, a belt position detection flag 332, a biasing unit 333, and a sensor unit 340. The belt position detection arm 331 is rotatably held in a state where a rotation center hole 331*a* is fitted to a rotation shaft 334, and the belt position detection flag 332 is provided as a flag member that swings in conjunction with the belt position detection arm 331. The belt position detection flag 332 is biased to rotate in a direction indicated by an arrow C+ in FIG. 7 by the biasing unit 333 provided on a rotation shaft of the belt position detection flag 332. As a result, the belt position detection arm 331 is biased to rotate in a direction indicated by an arrow B+ in FIG. 7. A detection unit 331*b* provided in the belt position detection arm 331 is in contact with an end surface of the fixing belt 301 at a light pressure that does not hinder the movement of the fixing belt 301 in the width direction W with the biasing force. In the present embodiment, this pressure is set to about 1 gf.

The belt position detection flag 332 has a rotation center hole 332*a*, and is rotatably held in a state where the rotation center hole 332*a* is fitted to a rotation shaft 335. In addition, the belt position detection flag 332 swings in conjunction with the belt position detection arm 331 via a long round hole 332*b* formed in the belt position detection flag 332 and a shaft 331*c* formed in the belt position detection arm 331.

The sensor unit 340 includes a plurality of optical sensors 341. The belt position detection flag 332 includes light shielding portions 332*c*, and the plurality of optical sensors 341 are provided near the light shielding portions 332*c*. When the posture angle of the belt position detection flag 332 changes and the light shielding portions 332*c* move, the on/off states of signals returned by the optical sensors 341 also change, so that the position of the fixing belt 301 can be detected by a combination of the signals. By combining the control of the motor M2 of the steering arm 325 described above and the shifted position detection unit 330 using the belt position detection flag 332, a shift of the fixing belt 301 is controlled.

Effect of Using Lubricant Application Roller as Steering Roller

Next, an effect of the present embodiment in which the lubricant application roller 308A is used as a steering roller will be described with reference to FIGS. 8A and 8B. Here, in a comparative example, the lubricant application roller was brought into contact with the inner peripheral surface of the fixing belt 301, separately from the steering roller that controlled a shift of the fixing belt 301. On the other hand, in an example, the lubricant application roller 308A was used as a steering roller as described above. The other configurations are the same between the comparative example and the example.

Figure 8A:
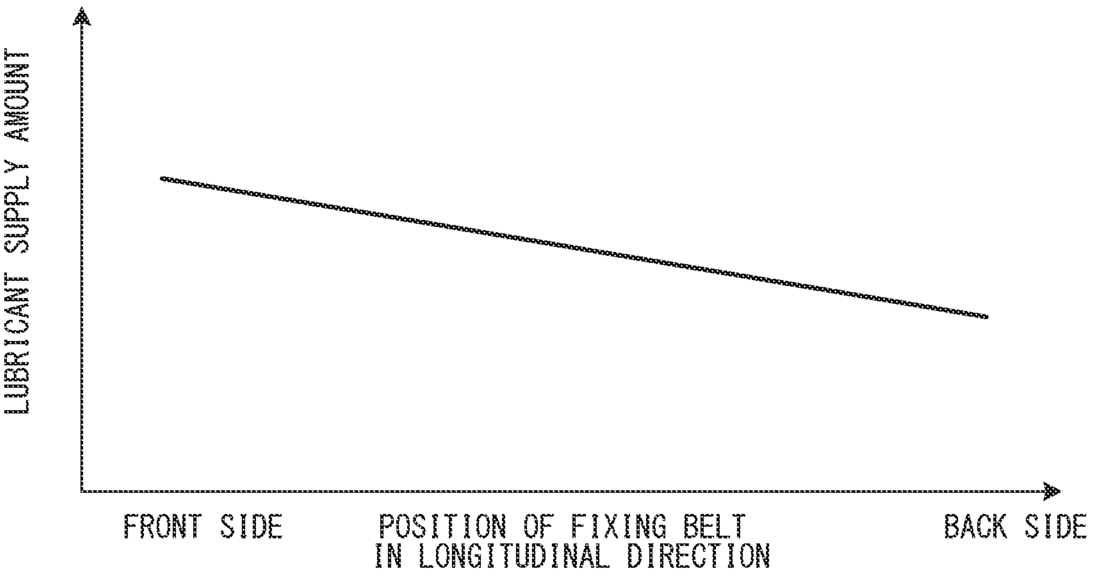
FIG. 8A is a graph illustrating a relationship between a position of a fixing belt in a longitudinal direction and a lubricant supply amount in a comparative example.
Figure 8B:
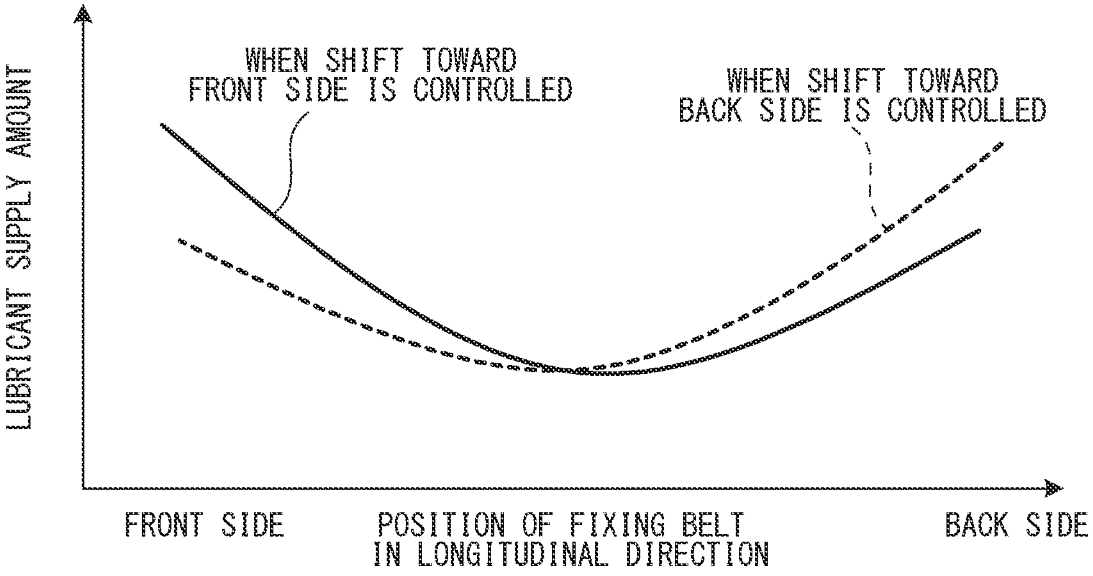
FIG. 8B is a graph illustrating a relationship between a position of a fixing belt in a longitudinal direction and a lubricant supply amount in an example.

FIG. 8A is a graph illustrating a relationship between a position of the fixing belt 301 in the longitudinal direction and a lubricant supply amount in the comparative example, and FIG. 8B is a graph illustrating a relationship between a position of the fixing belt 301 in the longitudinal direction and a lubricant supply amount in the example. In FIGS. 8A and 8B, the horizontal axis represents a position of the fixing belt 301 in the longitudinal direction, and the vertical axis represents a lubricant supply amount.

In the comparative example, when there is a difference in the pressurizing force of the lubricant application roller to the fixing belt 301 between the front side and the back side of the device (for example, in a case where the pressurizing force of the lubricant application roller on the front side is 55 N and the pressurizing force of the lubricant application roller on the back side is 45 N), the pressure of contact with the fixing belt 301 is always larger on the front side. For this reason, as illustrated in FIG. 8A, the lubricant supply amount on the front side is always larger than that on the back side, and causing unevenness in lubricant supply amount in the longitudinal direction of the inner peripheral surface of the fixing belt 301.

On the other hand, in the configuration of the present example, even when there is a difference in the pressurizing force of the lubricant application roller 308A to the fixing belt 301 between the front side and the back side of the device (for example, in a case where the pressurizing force of the lubricant application roller 308A on the front side is 55 N and the pressurizing force of the lubricant application roller on the back side is 45 N), it is possible to suppress an occurrence of unevenness in lubricant supply amount in the longitudinal direction of the inner peripheral surface of the fixing belt 301, because a shift of the fixing belt 301 is controlled.

That is, the lubricant application roller 308A swings according to the control of the shift, and the posture angle of the lubricant application roller 308A with respect to the fixing belt 301 changes. Therefore, in a case where the lubricant application roller 308A is tilted in the direction indicated by the arrow A+ to control the fixing belt 301 to be shifted to the front side as illustrated in FIGS. 6A and 6B, the pressure of contact and the lubricant supply amount increase on the front side of the fixing belt 301 (a solid line in FIG. 8B). On the other hand, in a case where the lubricant application roller 308A is tilted in the direction indicated by the arrow A- to control the fixing belt 301 to be shifted to the back side, the pressure of contact and the lubricant supply amount increase on the back side of the fixing belt 301 (a broken line in FIG. 8B). As a result, it is possible to reduce the difference in lubricant supply amount between the front side and the back side of the inner peripheral surface of the fixing belt 301.

In addition, by controlling a shift of the fixing belt 301 using the lubricant application roller 308A, it is possible to cope with the supply of the lubricant to the inner peripheral surface of the fixing belt 301 and the control of the shift of the fixing belt 301 in a space-saving manner. Therefore, according to the configuration of the present embodiment, it is possible to stably supply the lubricant to the inner peripheral surface of the fixing belt 301 and control a shift of the fixing belt 301, and it is also possible to achieve both size reduction and long life of the fixing belt 301.

Furthermore, according to the configuration of the present embodiment, since the lubricant application roller 308A serves as a steering roller, a tension roller, and a lubricant application member, space saving inside the belt can be achieved. In addition, since the oil impregnated layer 308*d* of the lubricant application roller 308A contacts the inner peripheral surface of the fixing belt 301 with a sufficient biasing force over a sufficient contact area, stable lubricant application can be realized. As a result, the reduction in size of the device can be easily achieved while applying the lubricant to the inner peripheral surface of the fixing belt 301.

In the present embodiment as well, similarly to the first embodiment, a roller portion may be provided, the roller portion being disposed at a position outside the oil impregnated layer 308*d* in the rotation axis direction of the lubricant application roller 308A while facing the inner peripheral surface of the fixing belt 301, and having a smaller outer diameter than the oil impregnated layer 308*d*.

Other Embodiments

In each of the above-described embodiments, the halogen heater is provided as a heating portion for heating the fixing belt on the heating roller. However, the heating portion may be provided on another stretching member, rather than the heating roller. In addition, the heating portion may be provided on the pad member. For example, a plate-shaped heat generating member such as a ceramic heater may be provided on a side of the pad member facing the fixing belt. The fixing belt may be heated by electromagnetic induction (IH). Further, in each of the above-described embodiments, instead of the heating portion disposed inside the roller, an external heating system in which another heating member is brought into contact with the belt or the roller from the outside for heating may be adopted.

In each of the above-described embodiments, the pressure roller is used as a driving rotary member. However, the driving rotary member may be an endless belt stretched by a plurality of stretching rollers and driven by any stretching roller. In each of the above-described embodiments, the pressure roller as a driving rotary member is pressurized against the belt to form a nip portion, but the belt may be pressurized against the driving rotary member. Furthermore, in each of the above-described embodiments, the fixing pad is used as a nip portion forming member, but the nip portion forming member may be a roller.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-032951, filed Mar. 3, 2023, which is hereby incorporated by reference herein in its entirety.

What is claimed is:

1. A fixing device that fixes a toner image to a recording material by heating the toner image borne on the recording material, the fixing device comprising:
- an endless belt member;
- a rotary member configured to rotate in contact with an outer peripheral surface of the belt member;
- a nip portion forming member disposed inside the belt member and configured to form a nip portion for nipping and conveying the recording material between the belt member and the rotary member; and
- a steering roller disposed inside the belt member and configured to be swung to control a position of the belt member in a width direction of the belt member,
- wherein the steering roller includes:
  - a lubricant impregnated portion impregnated with a lubricant and contacting an inner peripheral surface of the belt member; and
  - metal portions made of metal and contacting the inner peripheral surface of the belt member outside of the lubricant impregnated portion in the width direction,
- wherein the metal portions include:
  - a first metal portion disposed on a first end side in the width direction; and
  - a second metal portion disposed on a second side opposite to the first end side in the width direction, and
- wherein a length from a first end of the first metal portion to a second end of the second metal portion in the width direction is shorter than a length of the belt member in the width direction.

2. The fixing device according to claim 1, wherein the steering roller includes a core metal disposed inside the lubricant impregnated portion and the metal portions.

3. The fixing device according to claim 1, wherein, in a state where the steering roller is not in contact with the belt member, the lubricant impregnated portion has a larger outer diameter than the metal portions.

4. The fixing device according to claim 1, wherein the lubricant impregnated portion is formed of a nonwoven fabric.

5. The fixing device according to claim 1, wherein the lubricant impregnated portion is formed of a porous material.

6. The fixing device according to claim 1, wherein the nip portion forming member is a pad member.

7. The fixing device according to claim 1, further comprising a heating roller disposed inside the belt member and configured to heat the belt member.

* * * * *